US011174203B2

(12) United States Patent
de Diego et al.

(10) Patent No.: US 11,174,203 B2
(45) Date of Patent: Nov. 16, 2021

(54) CERAMIC MATRIX COMPOSITE TURBINE NOZZLE SHELL AND METHOD OF ASSEMBLY

(71) Applicant: General Electric Company, Schenectady, NY (US)

(72) Inventors: Peter de Diego, Zirconia, NC (US); John Ellington Greene, Greenville, SC (US); David Randall Hobart, Cincinnati, OH (US); James Joseph Murray, III, Mauldin, SC (US)

(73) Assignee: General Electric Company, Schenectady, NY (US)

( * ) Notice: Subject to any disclaimer, the term of this patent is extended or adjusted under 35 U.S.C. 154(b) by 370 days.

(21) Appl. No.: 16/170,773

(22) Filed: Oct. 25, 2018

(65) Prior Publication Data

US 2020/0131092 A1   Apr. 30, 2020

(51) Int. Cl.
*C04B 35/80* (2006.01)
(52) U.S. Cl.
CPC .................................. *C04B 35/80* (2013.01)
(58) Field of Classification Search
None
See application file for complete search history.

(56) References Cited

U.S. PATENT DOCUMENTS

| 4,564,543 | A | 1/1986 | Ritter |
| 5,429,853 | A | 7/1995 | Darrieux |
| 5,630,700 | A | 5/1997 | Olsen et al. |
| 6,676,373 | B2 | 1/2004 | Marlin et al. |
| 6,709,230 | B2 | 3/2004 | Morrison et al. |
| 7,028,462 | B2 | 4/2006 | Carper et al. |
| 7,510,379 | B2 | 3/2009 | Marusko et al. |
| 8,206,096 | B2* | 6/2012 | Prentice .................. F01D 5/282 415/191 |
| 8,714,932 | B2 | 5/2014 | Noe et al. |
| 9,151,166 | B2 | 10/2015 | Uskert |
| 9,308,708 | B2* | 4/2016 | Kleinow ................. B32B 18/00 |
| 9,708,918 | B2 | 7/2017 | Fremont et al. |
| 9,752,445 | B2 | 9/2017 | Watanabe |
| 9,981,438 | B2 | 5/2018 | Monaghan et al. |
| 2011/0008156 | A1* | 1/2011 | Prentice .................. F01D 9/042 415/200 |
| 2011/0027098 | A1* | 2/2011 | Noe .................. C04B 35/62868 416/241 B |

(Continued)

*Primary Examiner* — Matthew J Daniels
*Assistant Examiner* — Mohammad M Ameen
(74) *Attorney, Agent, or Firm* — McNees Wallace & Nurick LLC

(57) ABSTRACT

A method of manufacturing a ceramic matrix composite (CMC) turbine nozzle shell is provided. The method includes: assembling a primary outer nozzle platform, a primary inner nozzle platform, a core and trailing edge preform, and an airfoil-shaped body; joining the primary outer nozzle platform to a secondary outer nozzle platform of the airfoil-shaped body; and joining the primary inner nozzle platform to a secondary inner nozzle platform of the airfoil-shaped body. Composite plies circumferentially surround the airfoil-shaped body, and their longitudinal edges are cut into fingers that are folded down. The fingers are interleaved between secondary platform plies to form the secondary outer and inner nozzle platforms.

16 Claims, 11 Drawing Sheets

(56) References Cited

U.S. PATENT DOCUMENTS

| | | | |
|---|---|---|---|
| 2013/0251939 A1* | 9/2013 | Kleinow | F01D 5/284 428/121 |
| 2014/0010662 A1* | 1/2014 | Duelm | F01D 5/28 416/230 |
| 2014/0199174 A1 | 7/2014 | Roberts et al. | |
| 2014/0271208 A1* | 9/2014 | Garcia-Crespo | F01D 5/3084 416/194 |
| 2018/0163552 A1* | 6/2018 | Reynolds | F01D 5/282 |
| 2018/0230823 A1 | 8/2018 | Sippel et al. | |

* cited by examiner

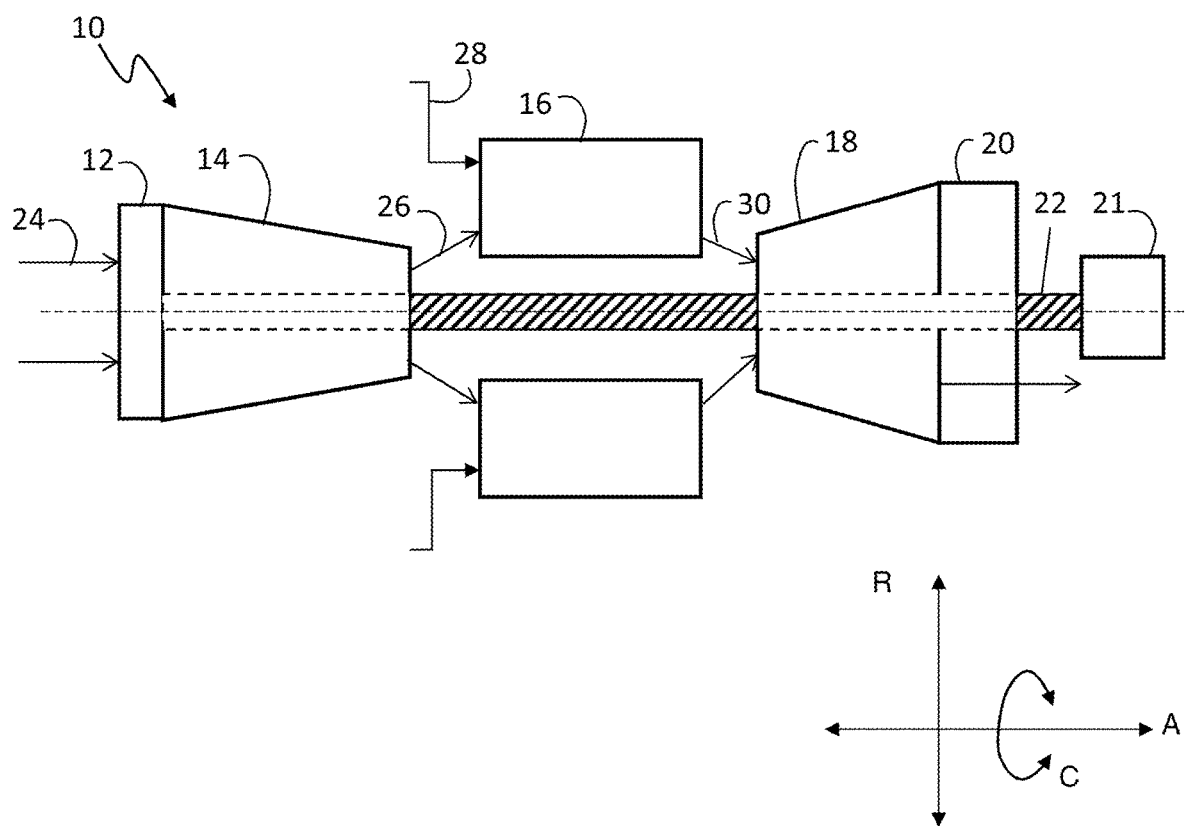
—FIG. 1—

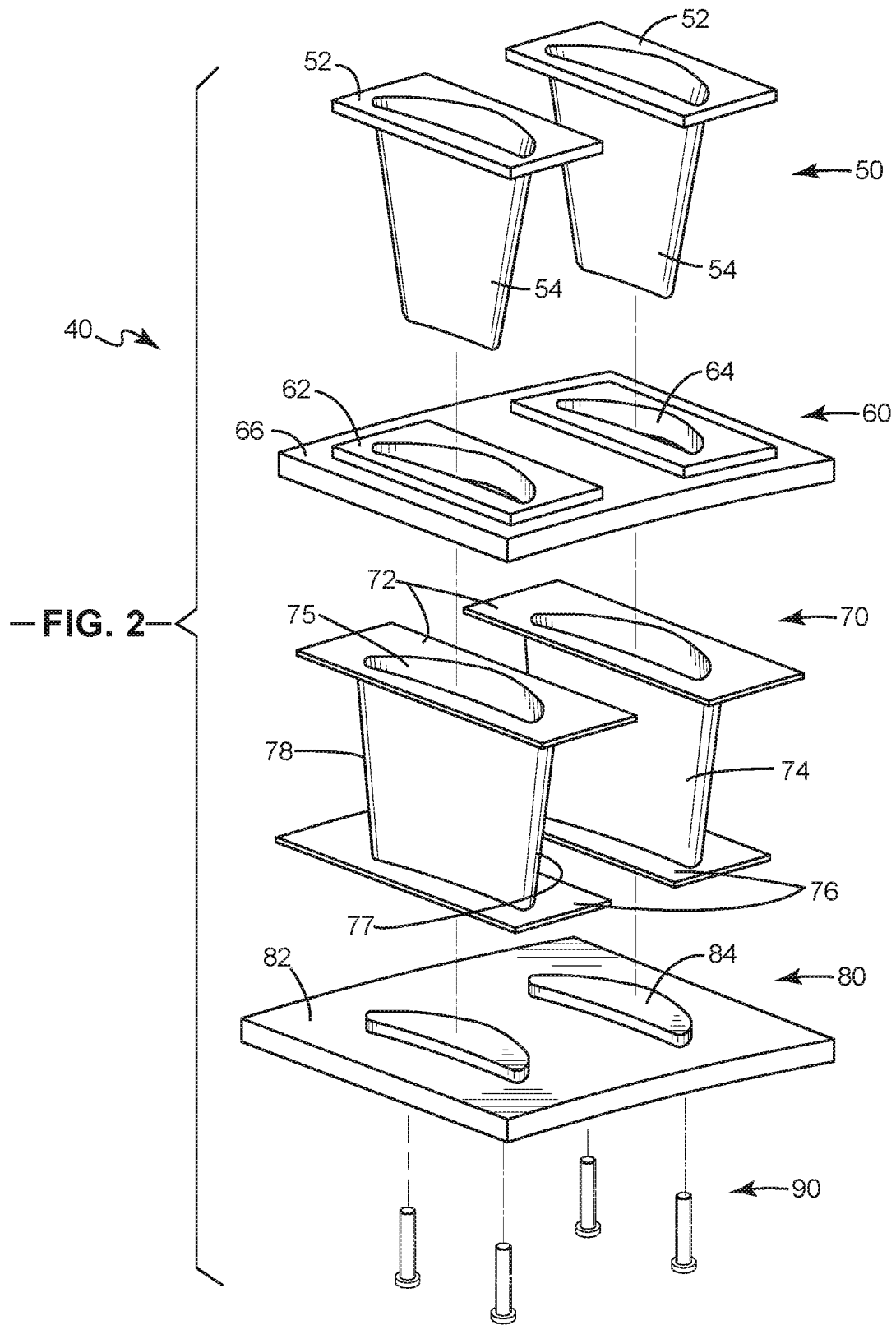

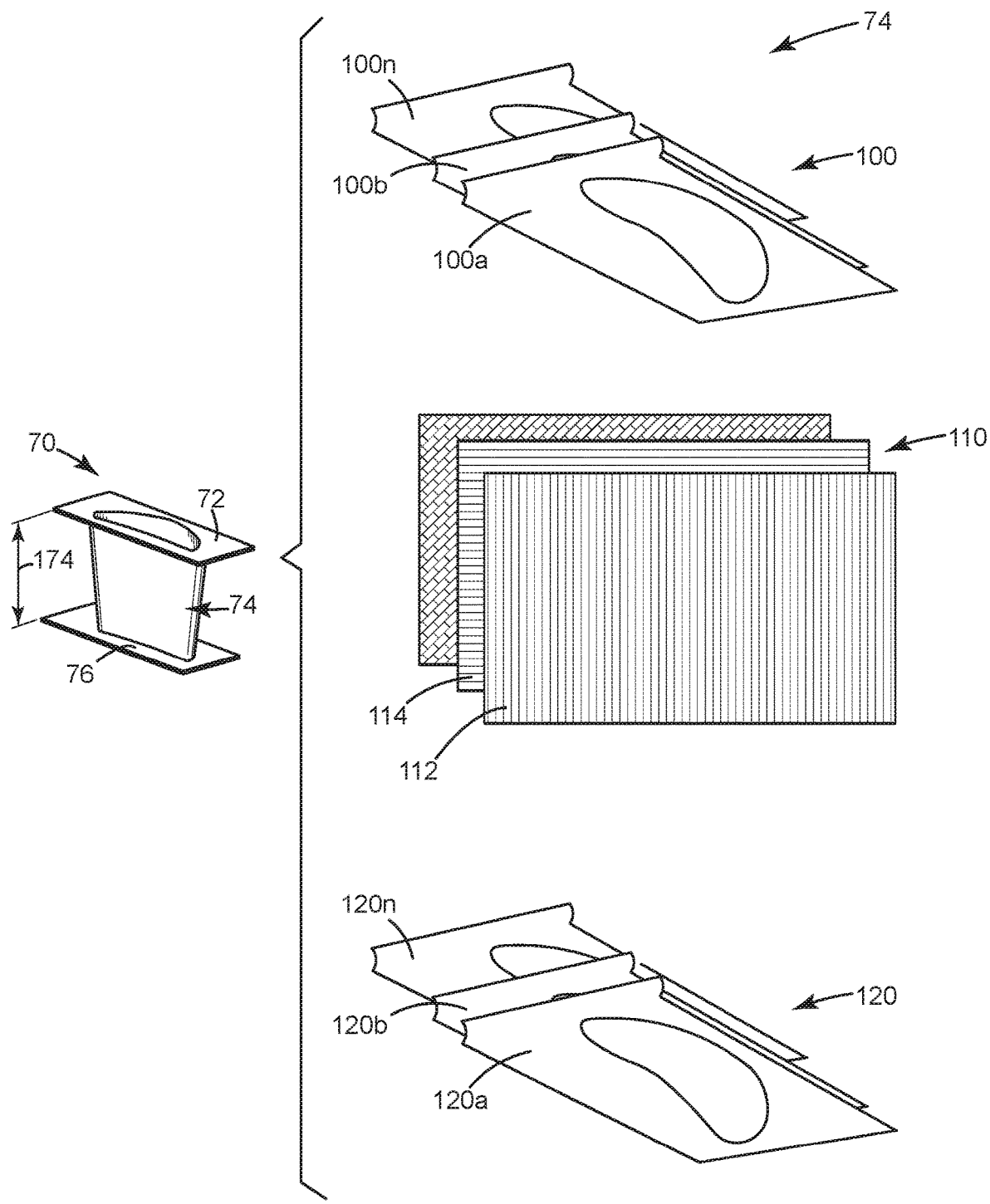
−FIG. 3−

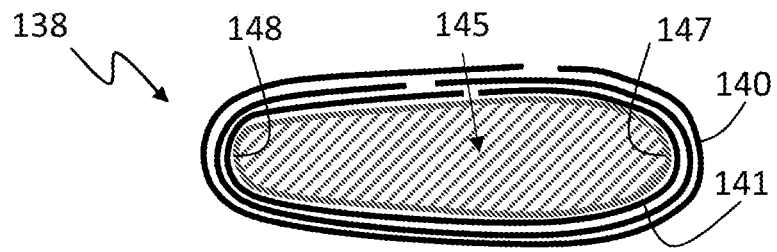
—FIG. 4—
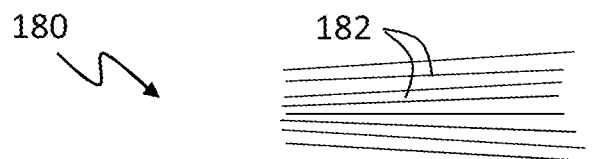
—FIG. 5—
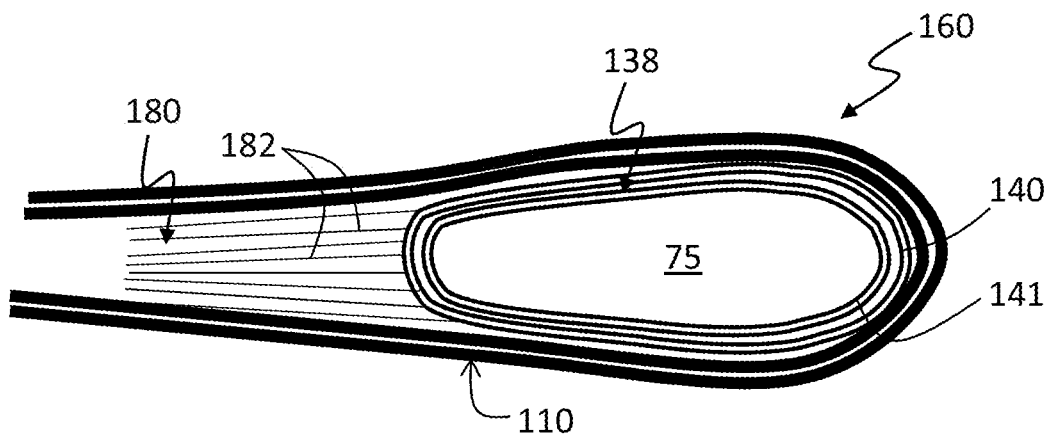
—FIG. 6—

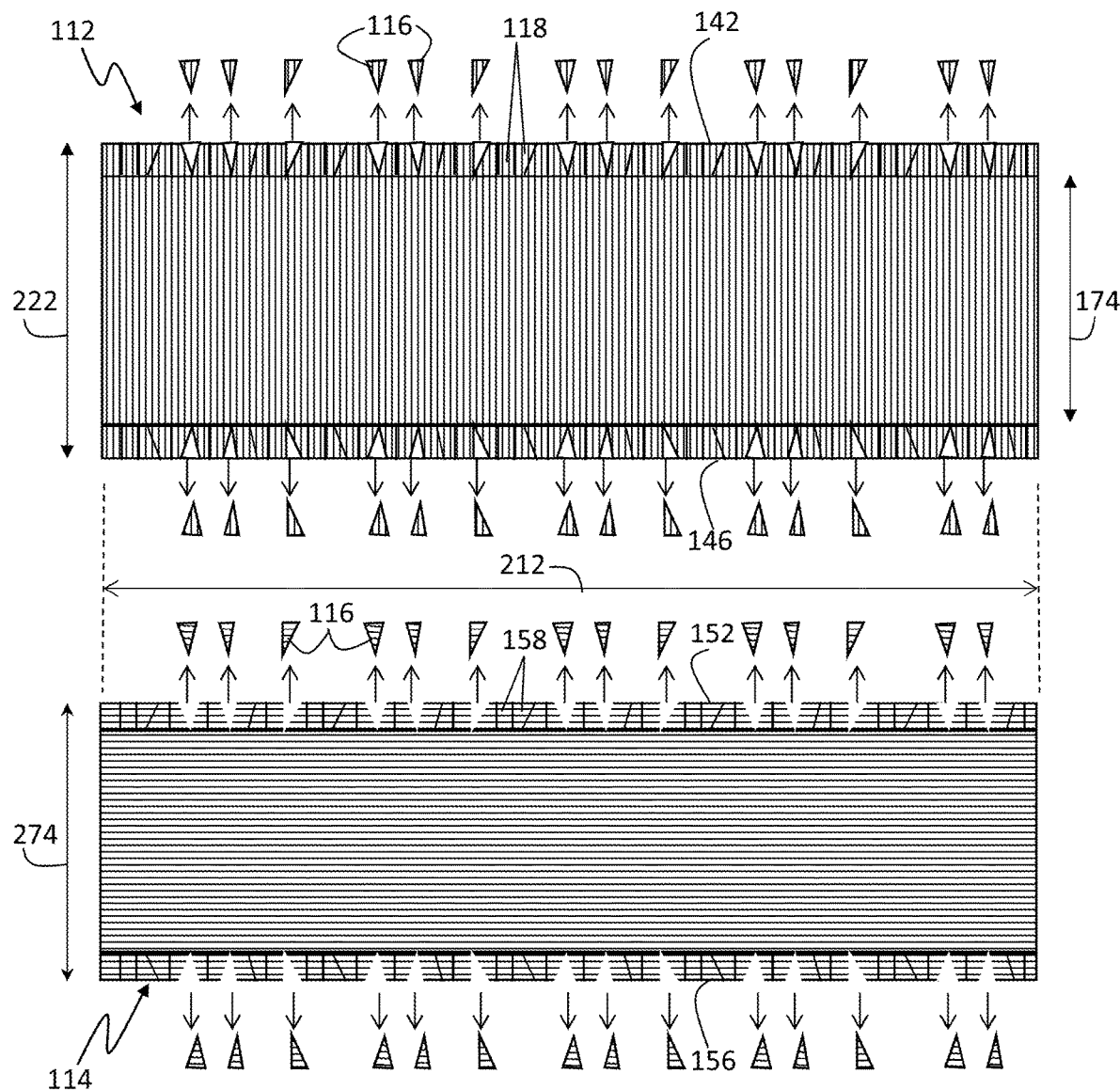
—FIG. 7—

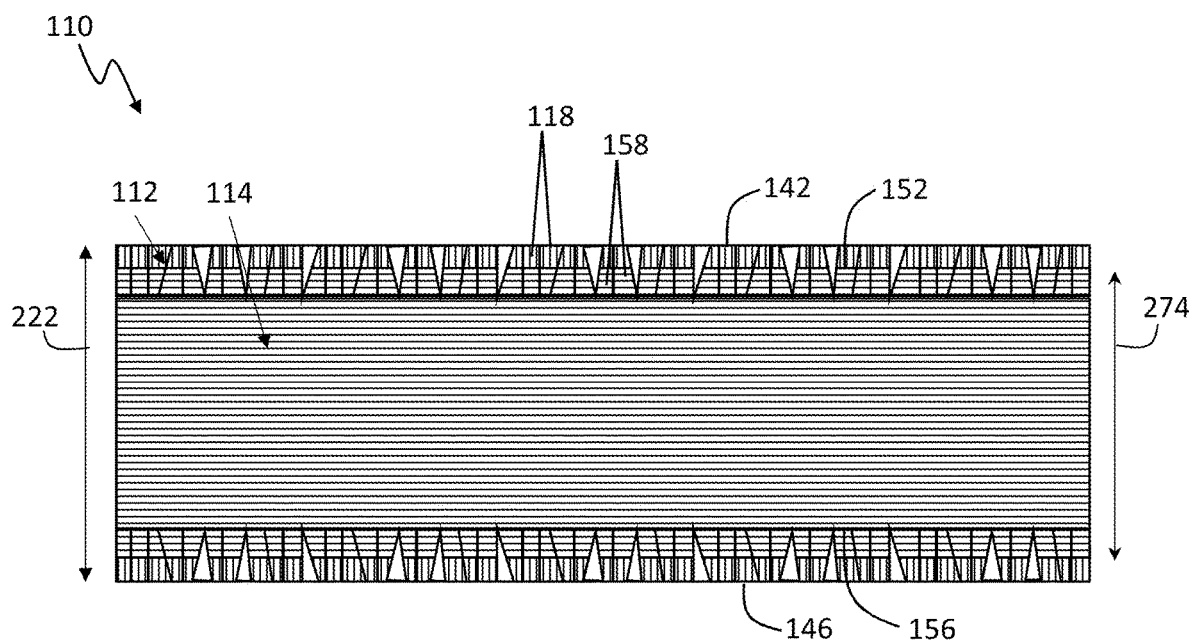
—FIG. 8—

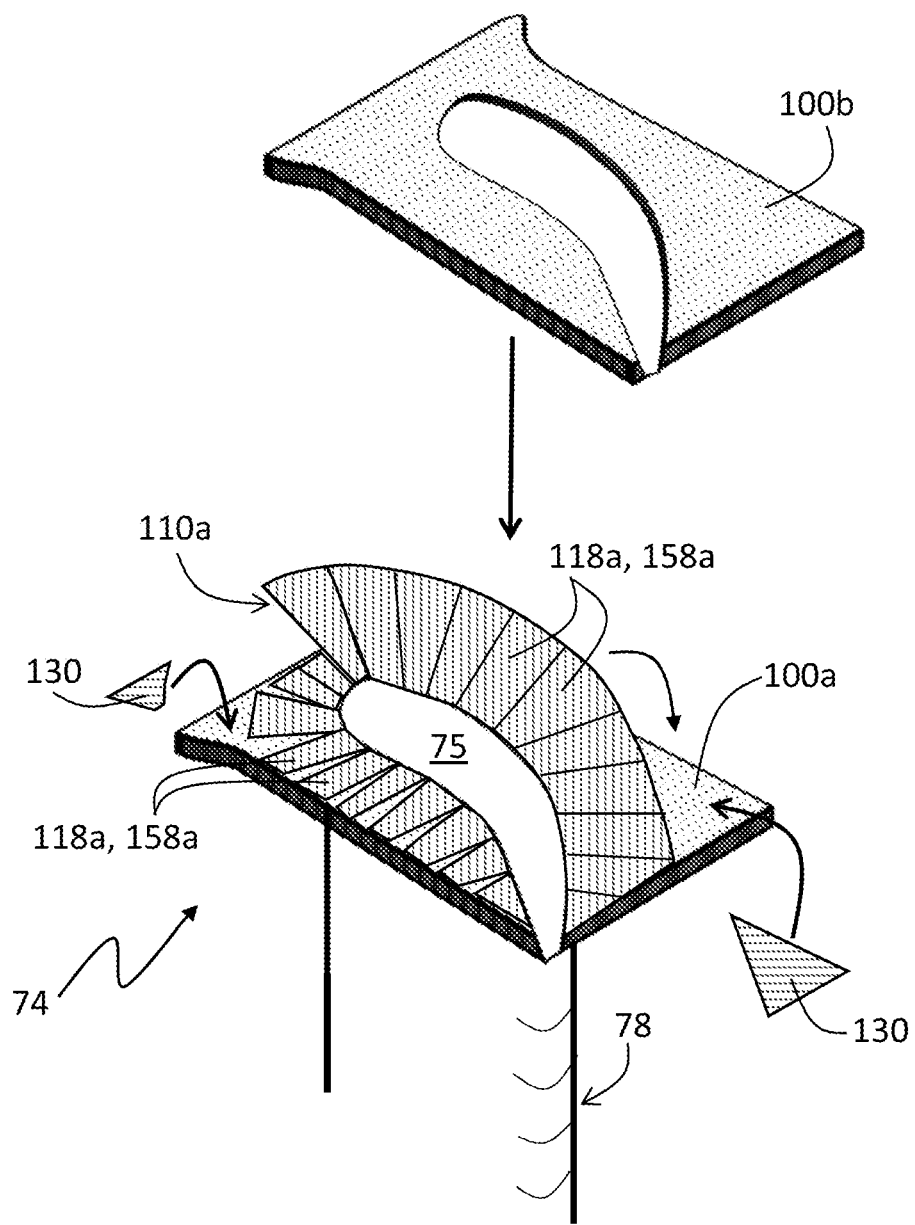
—FIG. 9—

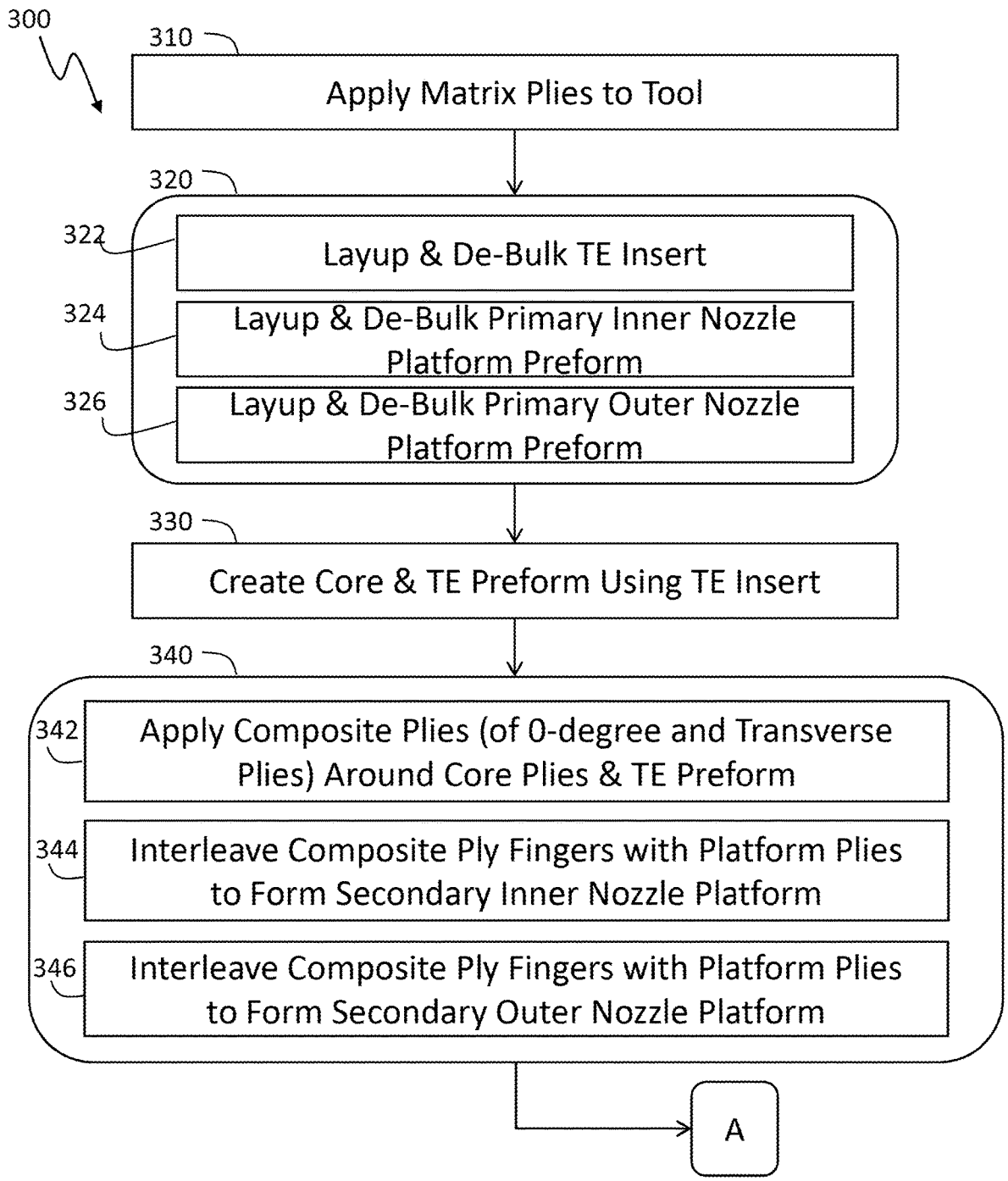
—FIG. 12A—

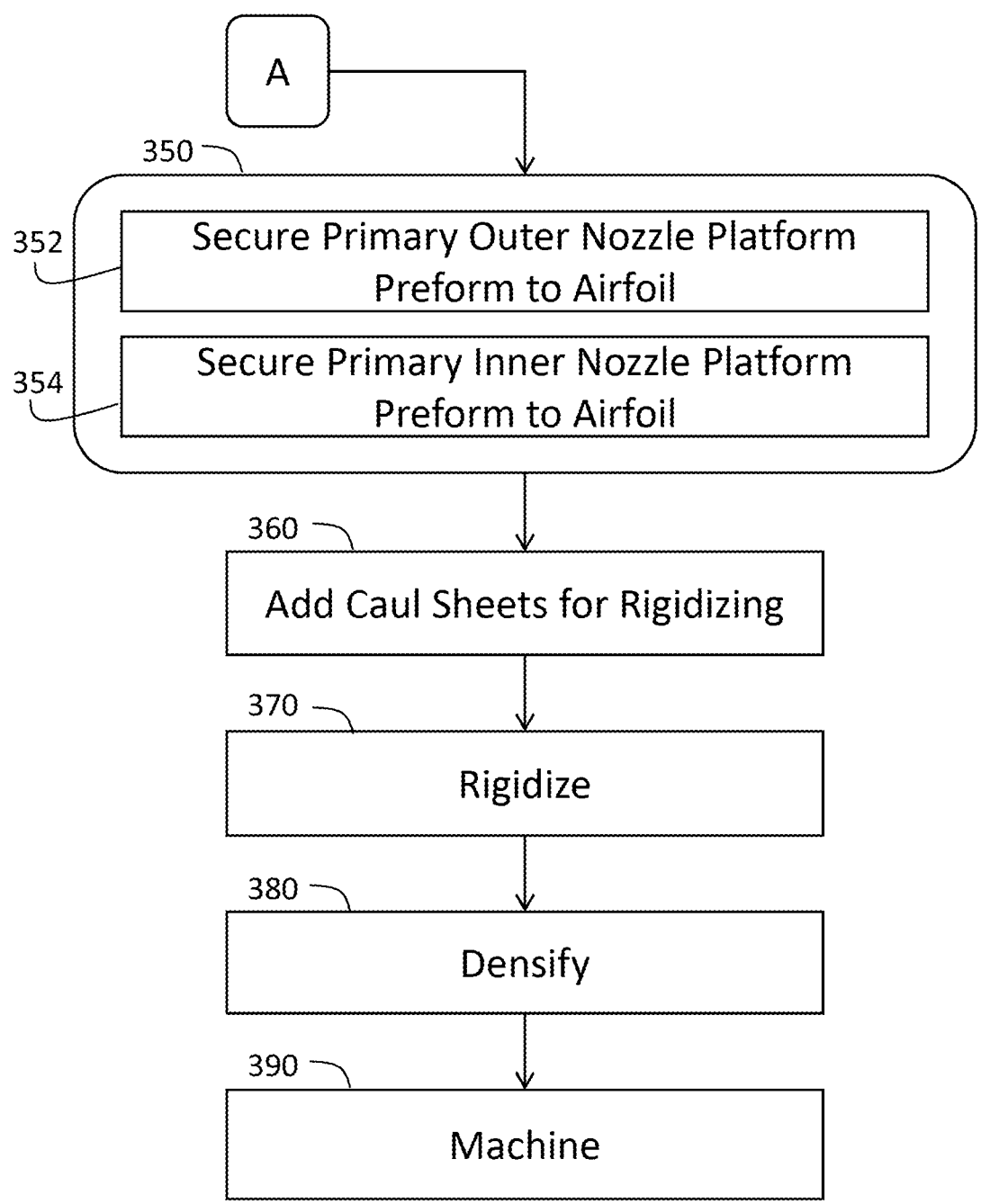
—FIG. 12B—

CERAMIC MATRIX COMPOSITE TURBINE NOZZLE SHELL AND METHOD OF ASSEMBLY

STATEMENT OF GOVERNMENT RIGHTS

The invention described in the present disclosure was made with the support of the U.S. Government under contract number DE-FE0024006, which was awarded by the Department of Energy. The U.S. Government has certain rights in this invention.

TECHNICAL FIELD

The present disclosure is directed to the field of ceramic matrix composite articles and processes for their production. More particularly, the disclosure is directed to more efficient processes for producing ceramic matrix composite (CMC) nozzles for a gas turbine, in which separately assembled preforms are combined to form the CMC nozzles.

BACKGROUND

Some conventional turbo machines, such as gas turbine systems, are utilized to generate electrical power. In general, gas turbine systems include a compressor, one or more combustors, and a turbine. Air may be drawn into a compressor, via its inlet, where the air is compressed by passing through multiple stages of rotating blades and stationary nozzles. The compressed air is directed to the one or more combustors, where fuel is introduced, and a fuel/air mixture is ignited and burned to form combustion products. The combustion products function as the operational fluid of the turbine.

The operational fluid then flows through a fluid flow path in a turbine, the flow path being defined between a plurality of rotating blades and a plurality of stationary vanes disposed between the rotating blades, such that each set of rotating blades and each corresponding set of stationary nozzles defines a turbine stage. As the plurality of rotating blades rotate the rotor of the gas turbine system, a generator, coupled to the rotor, may generate power from the rotation of the rotor. The rotation of the turbine blades also causes rotation of the compressor blades, which are coupled to the rotor.

More specifically, gas turbine nozzles are the static components of the turbine section, which are configured to direct hot gases (at temperatures above 2,200° F.) in a hot gas path to the rotating portions of the turbine to achieve rotational motion of the rotor. Typically, gas turbine nozzles and blades are made of superalloy (metallic) materials, which are coated with a thermal barrier coating and/or which are provided with sophisticated air-cooling features. However, the air diverted to the turbine components represents a parasitic loss for the gas turbine, which reduces the overall efficiency of the gas turbine.

By using more advanced materials, which can withstand the high temperature conditions in the hot gas flowpath, the volume of cooling air required to cool the components may be reduced. Ceramic matrix composites (CMCs) are one example of such advanced materials. Their properties reduce the cooling requirements for the respective parts, thereby improving gas turbine efficiency as compared to conventional gas turbines.

Assembling ceramic matrix composite components can be time-consuming, particularly if the component includes complex geometry. For example, a turbine nozzle includes a substantially hollow airfoil-shaped body that is positioned between an inner nozzle platform and an outer nozzle platform. A more efficient method of assembling CMC components would shorten the production time of these components.

In some instances, despite the improved thermal capabilities achieved with CMC materials, turbine nozzles may experience stress (with the potential for cracking) at the joints between the vertically oriented airfoil body and the horizontally oriented inner and outer platform walls. Therefore, an improved method of reinforcing these joints would improve the durability and useful life of these components.

SUMMARY

A method of manufacturing a ceramic matrix composite (CMC) turbine nozzle shell is provided. The method includes: assembling a primary outer nozzle platform, a primary inner nozzle platform, a core and trailing edge preform, and an airfoil-shaped body; joining the primary outer nozzle platform to a secondary outer nozzle platform of the airfoil-shaped body; and joining the primary inner nozzle platform to a secondary inner nozzle platform of the airfoil-shaped body.

The primary outer nozzle platform is assembled by stacking and hot-debulking a first plurality of platform plies, and the primary inner nozzle platform is assembled by stacking and hot-debulking a second plurality of platform plies. The trailing edge preform is assembled by stacking and hot-debulking a plurality of trailing edge plies in a generally V-shape. The core and trailing edge preform is assembled by wrapping a plurality of core plies around a tool having a wider end and a narrower end and by arranging the stacked trailing edge plies adjacent the narrower end of the plurality of core plies.

The airfoil-shaped body is assembled by circumferentially wrapping a set of composite wrap plies around the core and trailing edge preform. Each composite wrap ply of the set of composite wrap plies has a first layer with first unidirectional fibers oriented in parallel to a longitudinal axis of the turbine nozzle and a second layer with second unidirectional fibers oriented in a transverse direction relative to the first unidirectional fibers. The composite wrap ply has a first longitudinal edge and a second longitudinal edge. The first longitudinal edge and the second longitudinal edge are cut into fingers, and the fingers are folded in a transverse direction away from the core plies and interleaved between secondary platform plies to define a secondary inner nozzle platform and a secondary outer nozzle platform. The primary outer nozzle platform is joined to the secondary outer nozzle platform, and the primary inner nozzle platform is joined to the secondary inner nozzle platform.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which:

FIG. 1 is a functional block diagram of an exemplary gas turbine that may incorporate various embodiments of the present disclosure;

FIG. 2 is an exploded view of a turbine nozzle, according to one aspect of the present disclosure;

FIG. 3 is a schematic depiction of components used in the assembly of an airfoil preform, according to one aspect of the present disclosure;

FIG. 4 is a schematic overhead plan view of a core preform, according to the present disclosure;

FIG. 5 is a schematic overhead plan view of a trailing edge preform, according to the present disclosure;

FIG. 6 is a schematic overhead plan view of the core and trailing edge preform of FIGS. 4 and 5, around which an exemplary pair of composite wrap plies are wrapped;

FIG. 7 is a schematic depiction of a 0-degree ply and a 90-degree ply, prior to stacking as a composite wrap ply;

FIG. 8 is a schematic depiction of a composite wrap ply, which is assembled using the 0-degree ply and the 90-degree ply of FIG. 7;

FIG. 9 is a perspective view of a portion of an exemplary airfoil preform, illustrating initial steps performed during the fabrication of the airfoil preform of FIG. 3;

FIGS. 12A and 12B are flowcharts describing a process for manufacturing the present ceramic matrix composite nozzle preform.

DETAILED DESCRIPTION

Figure 10:
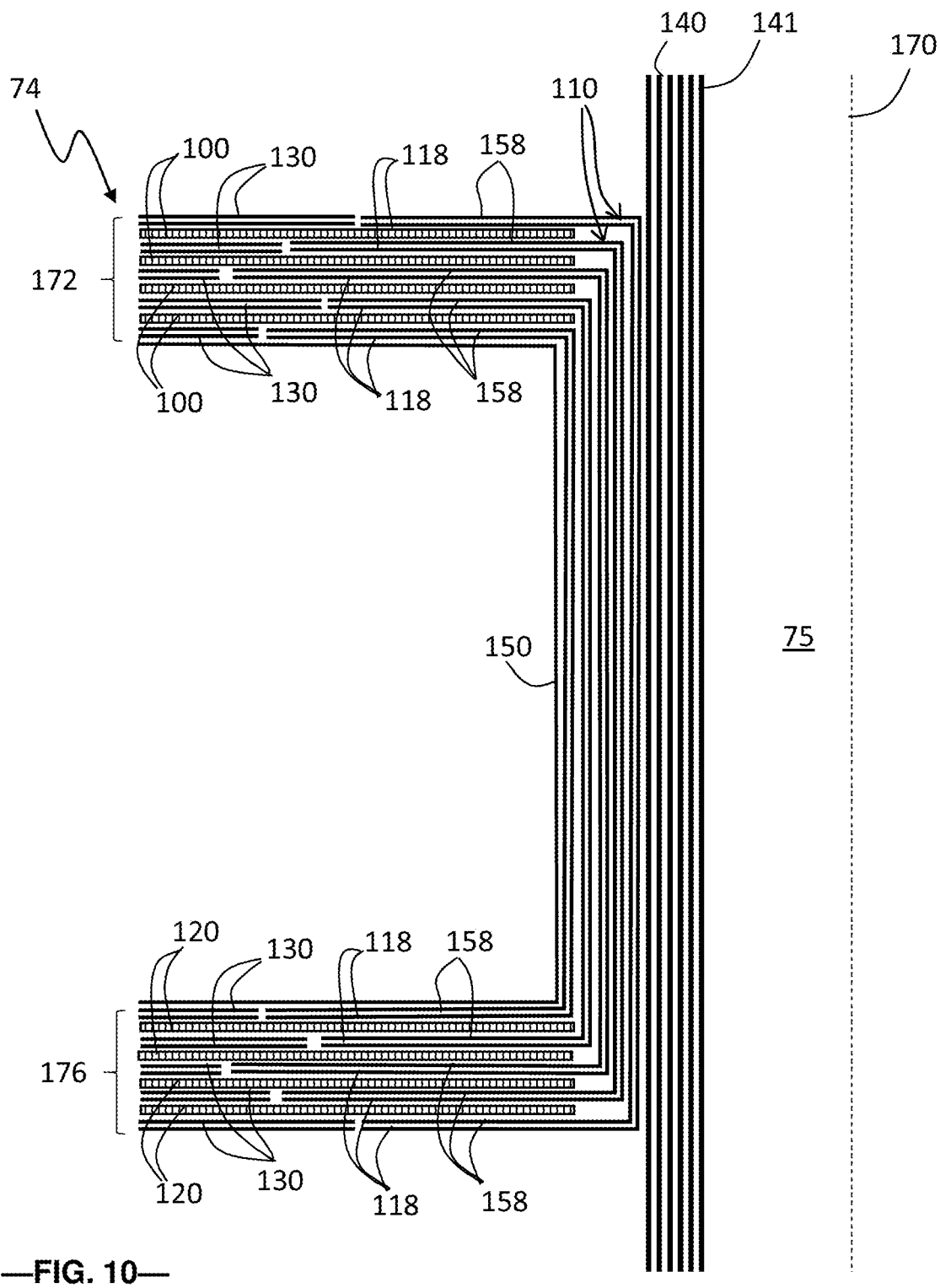
FIG. 10 is a schematic cross-sectional view of a portion of the airfoil preform of FIG. 3.

Reference will now be made in detail to various embodiments of the present disclosure, one or more examples of which are illustrated in the accompanying drawings. The detailed description uses numerical and letter designations to refer to features in the drawings. Like or similar designations in the drawings and description have been used to refer to like or similar parts of the disclosure.

To clearly describe the present ceramic matrix composite nozzles and the components thereof, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single integrated part.

In addition, several descriptive terms may be used regularly herein, as described below. The terms "first", "second", and "third" may be used interchangeably to distinguish one component from another and are not intended to signify location or importance of the individual components.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the gas turbine system. In the context of a particular part, such as the subject nozzle and airfoil preform, the terms "axial" and/or "axially" refer to the relative position/direction of objects along an axis A, which extends along the length of the part through its centerline (as shown in FIG. 3). As further used herein, the terms "radial" and/or "radially" refer to the relative position or direction of objects along an axis "R", which intersects axis A at only one location. In some embodiments, axis R is substantially perpendicular to axis A. Finally, the term "circumferential" refers to movement or position around axis A (e.g., axis "C"). The term "circumferential" may refer to a dimension extending around a center of a respective object (e.g., a rotor or a longitudinal axis of a part).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of manufacturing turbine nozzles for a land-based power-generating gas turbine for purposes of illustration, one of ordinary skill in the art will readily appreciate that embodiments of the present disclosure may be applied to other locations within a turbomachine and are not limited to turbine components for land-based power-generating gas turbines, unless specifically recited in the claims.

Referring now to the drawings, FIG. 1 schematically illustrates an exemplary gas turbine 10. The gas turbine 10 generally includes an inlet section 12, a compressor section 14 disposed downstream of the inlet section 12, a combustion section 16 disposed downstream of the compressor section 14, a turbine section 18 disposed downstream of the combustion section 16, and an exhaust section 20 disposed downstream of the turbine section 18. Additionally, the gas turbine 10 may include one or more shafts 22 (also known as "rotors") that couple the compressor section 14 to the turbine section 18. The shaft 22 is coaxial with the longitudinal axis of the gas turbine 10 and, specifically, the turbine section 18.

During operation, air 24 flows through the inlet section 12 and into the compressor section 14, where the air 24 is progressively compressed, thus providing compressed air 26 to the combustion section 16. At least a portion of the compressed air 26 is mixed with a fuel 28 within one or more combustors in the combustion section 16 and burned to produce combustion gases 30. The combustion gases 30 flow from the combustion section 16 to into the turbine section 18, where thermal and/or kinetic energy are transferred from the combustion gases 30 to rotor blades (not shown) attached to the shaft 22, thereby causing the shaft 22 to rotate. The mechanical rotational energy may then be used for various purposes, such as to power the compressor section 14 and/or to generate electricity, via a generator 21 coupled to the shaft 22. The combustion gases 30 exiting the turbine section 18 may then be exhausted from the gas turbine 10, via the exhaust section 20.

Within the turbine section 18, each row of rotor blades has a corresponding row of stationary nozzles 40 that are positioned between and that are attached to an outer side wall 60 and an inner side wall 80. Collectively, a row of the rotor blades and the adjacent stationary nozzles define a turbine stage. Generally, the length of the rotor blades and stationary nozzles increases with each stage, and many heavy-duty gas turbines 10 used for power generation have three or four turbine stages.

Gas turbines 10 are routinely operated at very high temperatures (e.g., with combustion gas temperatures in excess of 2,200° F., as the gases enter the turbine section 18). Such high temperatures require turbine blades and nozzles to be cooled to prevent component stress or failure. The amount of air diverted to the turbine section 18 for cooling the blades and nozzles 40 negatively impacts the efficiency of the gas turbine 10. Thus, to address the competing demands for power generation and high efficiency, some gas turbine manufacturers have contemplated using ceramic matrix composite (CMC) materials to create the blades and/or nozzles of one or more turbine stages. In particular, the blades and/or nozzles at the inlet end of the turbine section 18, which are exposed to higher temperatures, may be made of CMC materials.

Two such stationary turbine nozzles 40 are shown in an exploded view in FIG. 2. As described below, each turbine nozzle 40 is installed in a generally radial direction through an outer side wall 60 that circumscribes the interior of the turbine section 18 (a portion of which is shown in FIG. 2). The radially inner ends of the turbine nozzles 40 are secured to a circumferential inner side wall 80 (a portion of which is shown in FIG. 2). The inner and outer side walls 80, 60 are radially spaced apart from one another in a given turbine stage and define a portion of the hot gas path between the inner and outer side walls 80, 60.

Each turbine nozzle 40 includes a metal (e.g., superalloy) spar 50 that serves as the foundation of the nozzle 40. The metal spar 50 includes a mounting flange 52 and a hollow airfoil-shaped body 54 extending from the mounting flange 52. The metal spar 50 is installed through an opening 64 in the outer side wall 60, which corresponds in size and shape to the airfoil-shaped body 54 of the metal spar 50. The opening 64 is surrounded by a mounting ledge 62 that projects radially outward from a surface 66 of the outer side wall 60. When the metal spar 50 is installed, the mounting flange 52 of the metal spar 50 is in contact with the mounting ledge 62 and is secured to the mounting ledge 62 using removable mechanical fasteners, such as bolts (not shown).

A CMC nozzle shell 70 is positioned over the airfoil-shaped body 54 of the metal spar 50. The CMC nozzle shell 70 includes a primary outer nozzle platform 72, a primary inner nozzle platform 76, and an airfoil-shaped body 74 extending radially between the primary inner nozzle platform 76 and the primary outer nozzle platform 72. The airfoil-shaped body 74 is hollow or substantially hollow to receive a flow of cooling air. A cavity 75, which is sized and shaped to accommodate the airfoil-shaped body 54 of the metal spar 50, extends through the airfoil-shaped body 74 from the primary outer nozzle platform 72 to the primary inner nozzle platform 76. The airfoil-shaped body 74 includes a leading edge 77 and a trailing edge 78.

The inner side wall 80 includes a surface 82 that circumscribes the interior of the turbine section and a plurality of airfoil-shaped extensions 84 that project radially outward from the surface 82. Each airfoil-shaped extension 84 is sized and shaped to fit within the cavity 75 of a corresponding CMC nozzle shell 70. Mechanical fasteners 90 are used to secure the inner side wall 80 to the metal spar 50, capturing the CMC nozzle shell 70 between the outer side wall 60 and the inner side wall 80.

The process of manufacturing a ceramic matrix composite nozzle shell 70 has typically involved integrating the airfoil-shaped body 74 with the primary inner nozzle platform 76 and the primary outer nozzle platform 72, as one piece during the manufacturing process, much like conventional investment casting techniques used to make metal vanes. However, the detailed geometry of the nozzle shell 70 and the need to reduce stress at the joints between the body 74 and the primary nozzle platforms 72, 76 pose challenges to designing, manufacturing, and integrating CMC components into an affordable, producible design for turbine applications.

One method of manufacturing CMC nozzle shells is the method known as the melt infiltration (MI) process. In one method of manufacturing using the MI process, CMCs are produced using "prepreg" plies comprising silicon carbide (SiC)-containing fibers, each prepreg ply being in the form of a tape-like structure including the desired reinforcement material, a precursor of the CMC matrix material, and one or more binders. When the term "ply" is used herein, it should be understood as describing a prepreg, fiber-reinforced ply unless otherwise indicated. The term "silicon carbide-containing fiber" refers to a fiber having a composition that includes silicon carbide and preferably is substantially silicon carbine. For instance, the fiber may have a silicon carbide core surrounded with carbon or, in the reverse, may have a carbon core surrounded by or encapsulated with silicon carbide. The "matrix ply" refers to a tape-like structure made of a precursor of the CMC matrix material and one or more binders, which omits the fiber reinforcement materials.

Two prepreg plies may be used to produce a composite ply 110 (as shown in FIGS. 3, 7, and 8), in which one ply 112 has unidirectional fibers oriented in a first direction (e.g., at 0-degrees, which is parallel to the longitudinal axis of the nozzle shell 70) and one ply 114 has unidirectional fibers oriented in a second direction transverse to the first direction (e.g., at 90-degrees, which is perpendicular to the 0-degree fibers). Optionally, the composite ply 110 may include plies 111 containing fibers with other orientations, such as plies having fibers with an orientation of from +30 degrees to −30 degrees relative to the 0-degree fibers in the 0-degree ply 112.

FIG. 3 illustrates the CMC nozzle shell 70 and the components used to produce the airfoil-shaped body preform 74, according to one aspect of the present disclosure. The CMC nozzle shell 70 includes a primary outer nozzle platform 72, a primary inner nozzle platform 76, and the airfoil-shaped body preform 74 extending therebetween.

Specifically, the airfoil-shaped body preform 74 includes a first (outer) set of platform plies 100, which are labeled individually as outer platform ply 100a, 100b, . . . 100n; a set of composite wrap plies 110, one of which is illustrated as including a 0-degree ply 112, a 90-degree ply 114, and an optional third ply 111 having fibers at an orientation other than 0-degrees and 90-degrees; and a second (inner) set of platform plies 120, which are labeled individually as inner platform ply 120a, 120b, . . . 120n. The outer platform plies 100 define a secondary outer nozzle platform 172, and the inner platform plies 120 define a secondary inner nozzle platform 176 (as shown in FIG. 10). The outer platform plies 100 define an opening 102 therethrough that corresponds to the size and shape of the cavity 75. Likewise, the inner platform plies define an opening 122 therethrough that corresponds to the size and shape of the cavity 75.

Various numbers of plies 100, 110, and 120 may be used to produce the airfoil body preform 74, which includes the integrated secondary outer nozzle platform 172 and the integrated secondary inner nozzle platform 176. Specifically, the number of composite wrap plies in the set of composite plies 110 may vary, according to design needs. One exemplary range of composite plies 110 may be from five plies to twenty-five plies. The number "n" of platform plies 100, 120 may vary, according to design needs, but may be in the range of three to ten in each of the secondary outer nozzle platform 172 and the secondary inner nozzle platform 176. In one embodiment, the number of inner platform plies 120 in the secondary inner nozzle platform 176 is equal to the number of outer platform plies 100 in the secondary outer nozzle platform 172.

As will be evident from further discussion below, the number of platform plies 100, 120 is supplemental to the number of platform plies in the primary outer nozzle platform 72 and the primary inner nozzle platform 76 (shown in more detail in FIG. 11).

In addition to the composite wrap plies 110, the airfoil-shaped body preform 74 further includes an interior preform 160, as shown in FIG. 6. As shown in FIG. 4, a core preform 138 is defined by a set of core plies 140, which are wrapped circumferentially about a tool or mold 145 to define the interior cavity 75 of the CMC nozzle shell 70 (as shown in FIG. 6). The tool 145 has a wider end 147 that corresponds to the leading edge 77 of the airfoil-shaped body 74 and a narrower end 148 that interfaces with a trailing edge insert 180 (shown in FIG. 5). The innermost core ply 141 is a reinforcement-free matrix ply, while the remaining core plies 140 are fiber-reinforced. The seams of the core plies 140 may be staggered to achieve an approximately uniform thickness around the perimeter of the cavity 75.

The trailing edge insert 180 is positioned at the narrower end of the core plies 140 to supplement the desired airfoil shape. The trailing edge insert 180 includes a number of fiber-reinforced plies 182 that are stacked in such a way as to define a V-shaped cross-sectional profile. The plies 182 forming the trailing edge insert 180 may be stacked with alternating fiber orientations, if so desired. After stacking, the trailing edge insert 180 may be subjected to hot de-bulking and green-machining, as described further herein.

As shown in FIG. 6, the composite wrap plies 110 are wrapped circumferentially around the core plies 140 and the trailing edge insert 180 from the trailing edge (78) of the airfoil-shaped preform 74 on the pressure (concave) side to the trailing edge 78 of the preform 74 on the suction (convex) side (or vice versa). FIG. 6 illustrates two exemplary composite wrap plies 110, although it should be understood that more than two composite wrap plies 110 are typically used. Each composite wrap ply 110 includes at least one 0-degree ply 112 and at least one 90-degree ply 114.

The outermost surface of the airfoil body preform 74 is produced by one or more matrix plies 150 (shown in FIG. 10), which include the suitable precursor of the desired ceramic matrix material but which exclude the reinforcement fibers found in the core plies 140 and the composite wrap plies 110. The reinforcement-free matrix ply (plies) 150 protect the reinforcement fibers at the surfaces of the airfoil preform 74 during the completion of the fabrication process.

As shown in FIG. 7, the composite plies 110, as discussed above, include a 0-degree ply 112 and a 90-degree ply 114, each of which is generally rectangular with a length 212 and a width 222, 274, respectively, that is less than the length 212. The 0-degree ply 112 has an outer longitudinal edge 142 and an inner longitudinal edge 146, and the width 222 is defined between the longitudinal edges 142, 146. The 90-degree ply 114 has an outer longitudinal edge 152 and an inner longitudinal edge 156, and the width 274 is defined between the longitudinal edges 152, 156.

The width 222 of each 0-degree ply 112 is greater than a height 174 of the airfoil-shaped body preform 74 (shown in FIG. 3) and is greater than the width 274 of each 90-degree ply 114. The width 274 of each 90-degree ply 114 is also greater than the height 174 of the airfoil-shaped body preform 74 but may be less than the width 222 of the 0-degree ply 112. The width 222 of the 0-degree plies 112 used in the composite plies 110 may vary—that is, the 0-degree plies 112 that are radially disposed closer to the longitudinal axis 170 of the airfoil-shaped body preform 74 may be wider than the 0-degree plies 112 that are radially disposed toward the outer surface of the preform 74.

To facilitate the interleaving of the 0-degree ply 112 and the 90-degree ply 114 with the outer and inner platform plies 100, 120, as described further below, the longitudinal edges 142, 146 of the 0-degree ply 112 and the longitudinal edges 152, 156 of the 90-degree ply 114 are cut according to a prescribed pattern. The cuts to the 0-degree ply 112 and the 90-degree ply 114 produce ply fingers 118, 158 that are folded in composite layers in a direction substantially perpendicular to and away from the longitudinal axis 170 of the airfoil-shaped preform 74 to form a perimeter around the cavity 75 with little to no overlap of adjacent fingers 118 in each individual composite ply 110. In some instances, it is necessary to remove material 116 from the longitudinal edges 142, 146, 152, 156 to ensure that the fingers 118, 158 lay flat when folded around the pressure side and suction side of the curved cavity 75.

A center panel 113 of the 0-degree ply 112 is disposed between the longitudinal edge 142 and the longitudinal edge 146 with enough margin to produce the fingers 118 having the desired width. As shown in FIG. 8, the 90-degree ply 114 with its pre-cut fingers 158 may be stacked with the 0-degree ply 112 with its pre-cut fingers 118, such that a center portion of the 90-degree ply 114 is aligned with the center panel 113 of the 0-degree ply 112, to define the composite wrap ply 110. Paper or foil strips may be used to separate the cut fingers 118, 158 of one composite wrap ply 110 from each other and/or from the cut fingers 118, 158 of an adjacent composite wrap ply 110, until such time as the fingers 118, 158 are laid down.

The composite wrap plies 110 (one of which is shown as composite wrap ply 110a in FIG. 9) have longitudinal edges (e.g., 142, 152) that extend beyond the airfoil-shaped body 74 and that are cut into fingers 118, 158 that are incorporated into a secondary outer nozzle platform 172 and a secondary inner nozzle platform 176 of the airfoil-shaped preform 74 (as shown in FIG. 10). The composite ply 110a wraps around the core plies 140 (shown in FIG. 10) that define the interior of the cavity 75, and the fingers 118a, 158a are folded in a direction transverse to, and away from, the longitudinal axis 170 to conform to the curved shapes of the pressure side and the suction side of the airfoil-shaped body 74. In some instances, material 116a between adjacent fingers 118a, 158a is removed, so that the fingers 118a, 158a are better able to lie flat against an outer platform ply 100a.

Once all the fingers 118a, 158a of the composite ply 110a are folded down, there may be some areas at the corners of the outer platform ply 100a that are not covered by the fingers 118a, 158a. In these areas, it is desirable to include filler panels 130 to create a layer of uniform thickness before the application of the subsequent outer platform ply 100b and the folding down of the fingers 118, 158 of another 0-degree ply 112 (e.g., 112b, not shown in this Figure). The filler panels 130 may be made of the removed material 116a or from additional fiber-reinforced plies having the same or different fiber orientation as the 0-degree ply 112a.

The outer platform ply 100a may have the same or different fiber orientation as the outer platform ply 100b. In one embodiment, the outer platform ply 100a may have fibers oriented at 0-degrees, while the outer platform ply 100b may have fibers oriented at 90-degrees (or some other non-zero angle). The fiber orientation of the outer platform plies 100 may vary from layer to layer. Additionally, while a single outer platform ply 100 is illustrated for insertion between the folded fingers 118, 158 of the composite wrap plies 110, it should be understood that different numbers (e.g., two or more) of outer platform plies 100 may be inserted together between the folded fingers 118, 158 of the composite wrap plies 110, as desired.

The process of folding the fingers 118, 158 of the composite wrap plies 110 and positioning the filler panels 130 and of then applying an outer platform ply 100 continues until all the composite wrap plies 110 are folded. The process is likewise repeated with the inner platform plies 120 for the inner nozzle platform 176.

The folding of the fingers 118, 158 of the composite wrap plies 110 is described as involving the folding of the 0-degree fingers 118 and the 90-degree fingers 158 in unison, such that the fingers 118, 158 of a single composite wrap ply 110 are disposed between adjacent platform plies 100 (or 120). However, it should be understood that the 0-degree fingers 118 and the 90-degree fingers 158 of an individual composite wrap ply 110 may be separated by an intermediately positioned platform ply 100 (or 120), if so desired. In this configuration, the number of platform plies 100, 120 would be greater than the number of platform plies 100, 120 used in the embodiment in which the fingers 118, 158 of each composite ply 110 are folded at the same time.

A cross-section of a portion of the airfoil-shaped body preform 74 is shown in FIG. 10. The core wraps 140 are disposed radially outward of the longitudinal axis 170 of the airfoil-shaped body preform 74. The body includes alternating composite wrap plies 110 (made of 90-degree plies 114 and 0-degree plies 112) (e.g., 110a, 110b, 110c) whose longitudinal edges 142, 152 have been cut into fingers 118, 158 that are folded in a transverse direction relative to the longitudinal axis 170. The fingers 118, 158 and any necessary filler panels 130 are interleaved between outer platform plies 100 (e.g., 100a, 100b, 100c) to form a secondary outer nozzle platform 172 that is integral with the airfoil-shaped body 74.

Similarly, the fingers 118, 158 and any necessary filler panels 130 are interleaved between the inner platform plies 120 (e.g., 120a, 120b, 120c) to form a secondary inner nozzle platform 176 that is integral with the airfoil-shaped body 74 opposite the secondary outer nozzle platform 172. A reinforcement-free matrix ply 150 forms a smooth surface on the exterior of the airfoil-shaped body preform 74. As the plies 112, 114 are applied to the tool, the plies 112, 114 produce concave fillets (not shown) that form a rounded angle between the airfoil-shaped body 74 and each of the secondary outer nozzle platform 172 and the secondary inner nozzle platform 176.

If desired, additional fiber-reinforcement plies (not shown) may be rolled up into a long "noodle" and wrapped circumferentially about the perimeter of the airfoil-shaped body preform 74, such that the rolled-up "noodle" plies are disposed within the voids between the composite wrap plies 110 and the platform plies 100, 120 or in any other void locations.

In a conventional airfoil-shaped body preform, the 90-degree plies are truncated and do not fold over for incorporation into the secondary nozzle platforms. Rather, only the 0-degree plies are used as reinforcement layers in the joints between the airfoil portion and the platform portions of the airfoil-shaped body preform. As a result, the resulting CMC nozzle shell may be prone to weakness and cracking at the joints.

In contrast, the present embodiments described herein fold and interleave with the platform plies 100, 120 both the 0-degree plies 112 and the 90-degree plies 114, thereby reinforcing the joints of the airfoil-shaped body preform 74 and the subsequent CMC nozzle shell 70.

Figure 11:
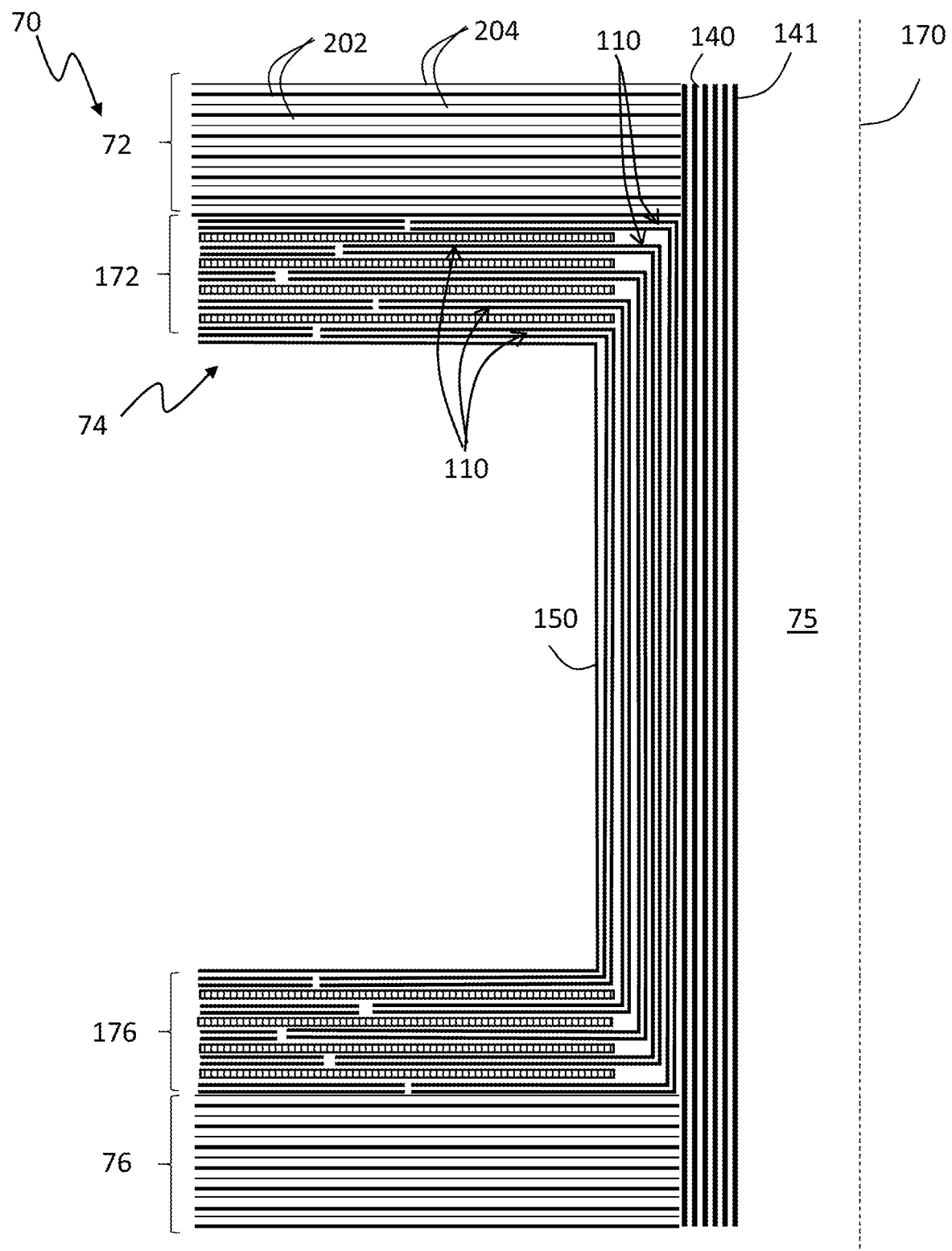
FIG. 11 is a schematic cross-sectional view of a portion of a ceramic matrix composite nozzle preform of FIG. 2.

FIG. 11 illustrates a partial cross-section of the CMC nozzle shell 70, in which the primary outer nozzle platform 72 and the primary inner nozzle platform 76 are joined to the airfoil-shaped body preform 74 with its integral secondary outer nozzle platform 172 and integral secondary inner nozzle platform 176. The primary outer nozzle platform 72 and the primary inner nozzle platform 76 each are formed from a stacked set of fiber-reinforced platform plies 202, 204. Each platform ply 202, 204 includes an opening therein that surrounds the cavity 75 of the CMC nozzle shell 70 (similar to the outer platform ply 100 and the inner platform ply 120). The primary outer nozzle platform 72 may have the same number of platform plies 202, 204 as the primary inner nozzle platform 76. In one embodiment, a total of between 10 and 20 platform plies are used for each of the outer nozzle platform 72 and the inner nozzle platform 76, which includes any combination of plies 202 (reinforced with fibers in a first direction) and plies 204 (reinforced with fibers in a second, transverse direction).

The platform plies 202 may have a first fiber orientation, while the platform plies 204 may have a second fiber orientation transverse to the first fiber orientation. In one embodiment, the platform plies 202 and the platform plies 204 may have fibers that are disposed at a 90-degree offset from one another. The platform plies 202, 204 may be arranged in alternating fashion or in a pattern-wise arrangement.

The primary outer nozzle platform 72 and the primary inner nozzle platform 76 are subjected to de-bulking and green machining after the respective platform plies 202, 204 are stacked.

FIGS. 12A and 12B define a process 300 for manufacturing the components of the CMC nozzle shell 70 and assembling the CMC nozzle shell 70, according to the present disclosure. In step 310, one or more matrix plies 150 are circumferentially disposed around a tool (not shown) that defines the outer shape of the CMC nozzle shell 70. The matrix plies 150 may define one or more layers that provide a smooth protective surface over the fiber-reinforced composite plies 110, the outer platform plies 100, and the inner platform plies 120.

Step 320 defines the production of several preform structures used to produce the CMC nozzle shell 70, including the trailing edge preform 180, the inner nozzle platform preform 76, and the outer nozzle platform preform 72.

In step 322, the trailing edge (TE) preform 180 (shown in FIG. 5) is assembled, which will be incorporated as part of a core and trailing edge preform 160 (see FIG. 6). The trailing edge plies 182 may be stacked together to define a V-shaped trailing edge preform 180 that is coupled to the core plies 140. The stacked trailing edge plies 182 may be subjected to de-bulking and green machining before being coupled with the core plies 140.

In step 324, the inner nozzle platform 76 is produced by stacking a plurality of platform plies 202, 204 on one another. The platform plies 202, 204 may be unidirectional fiber reinforced plies, and the fiber orientation of the platform plies 202 may be transverse to the fiber orientation of the platform plies 204. In one embodiment, the fibers in the platform plies 202 may be perpendicular to the fibers in the platform plies 204. The platform plies 202, 204 may be stacked in an alternating pattern (e.g., 202-204-202-204, etc.) or may be stacked in some other pattern (e.g., 202-202-204-202-202-204, etc.).

In step 326, the outer nozzle platform 72 is produced by stacking a plurality of platform plies 202, 204 on one another. The platform plies 202, 204 may be unidirectional fiber reinforced plies, and the fiber orientation of the platform plies 202 may be transverse to the fiber orientation of the platform plies 204. In one embodiment, the fibers in the platform plies 202 may be perpendicular to the fibers in the platform plies 204. The platform plies 202, 204 may be stacked in an alternating pattern (e.g., 202-204-202-204, etc.) or may be stacked in some other pattern (e.g., 202-202-204-202-202-204, etc.).

Once the platform plies 202, 204 forming the outer nozzle platform 72 and the inner nozzle platform 76 are stacked, the stacked plies 202, 204 may be subjected to de-bulking and "green-machining" in which the plies 202, 204 are machined to a close-to-desired final shape. Green-machining may include cutting, milling, and grinding, as is known in the art. It is easier to machine the platforms 72, 76 in a "green" state prior to rigidizing and densifying.

Steps 310, 322, 324, and 326 may be performed in any order. Advantageously, these steps 310, 322, 324, and 326 may be performed simultaneously to reduce manufacturing time.

In step 330, the core plies 140 are circumferentially wrapped around a tool 145 (shown in FIG. 4) to define the cavity 75 of the CMC nozzle shell 70. The core plies 140 may be staggered, so that the edges of each ply 140 are circumferentially offset from one another, thereby providing a uniform thickness around the cavity 75. The innermost core ply 140 may be a fiber-less matrix ply. The trailing edge insert 180 is aligned with the narrow end of the tool 145 and wrapped core plies 140, thereby forming a core and trailing edge preform 160.

Step 340 results in the production of the airfoil-shaped body 74 with its integral outer and inner nozzle platforms 172, 176. In step 342, composite wrap plies 110, which include 0-degree plies 112 and 90-degree (or transverse) plies 114, are circumferentially wrapped around the core and trailing edge preform 160 to define the body of the airfoil-shaped body preform 74. The composite wrap plies 110 are applied in a manner to produce an alternating arrangement of 0-degree plies 112 and 90-degree (or transverse) plies 114. The longitudinal edges 142, 146 of the 0-degree plies 112 and the longitudinal edges 152, 156 of the 90-degree plies 114 are pre-cut according to a predetermined pattern to produce fingers 118, 158 that are interleaved with platform plies 120 to form the integral inner nozzle platform 176 (step 344) and that are interleaved with platform plies 100 to form the integral outer nozzle platform 172 (step 346). As described above, although not specifically listed in the flowchart, areas of the platform plies 100 or 120 not covered by the fingers 118, 158, when folded away from the core plies 140, may be covered with filler panels 130. Steps 344 and 346 may be performed in either order. The airfoil-shaped body preform 74 may be de-bulked and/or green-machined, if desired, before step 350.

In step 350, the airfoil-shaped body preform 74 is joined to the outer nozzle platform 72 (formed in step 326) and the inner nozzle platform 76 (formed in step 324). In step 352, the outer nozzle platform 72 is joined to the integral outer nozzle platform 172 of the airfoil-shaped body preform 74. In step 354, the inner nozzle platform 76 is joined to the integral inner nozzle platform 176 of the airfoil-shaped body preform 74. Steps 352 and 354 may be performed in either order.

Caul sheets (not shown) or other known tool components for rigidizing processes can then be applied to the surfaces of the non-rigidized CMC nozzle shell 70 in preparation for rigidizing (step 360). The caul sheets are rubbery and expand at a higher rate than rigid tooling, making the caul sheets useful to apply pressure during an autoclave cycle. The caul sheets provide compaction force for the composite component in areas that are blocked by rigid tooling and permit formation of a densified composite having a desired geometry. The term "non-rigidized" (and grammatical equivalents thereof) describes objects that have not been rigidized at all or, at a minimum, have been partially rigidized to a point that the rigidizing is insubstantial.

Next, the non-rigidized vane preform can be rigidized to compact and set the plasticizers in the prepreg plies (step 370). The components may be rigidized in an autoclave at elevated temperatures and pressures. While not so limited, the components may be rigidized at temperatures from about 200° C. to about 400° C. and at pressures from about 50 psig to about 300 psig. Additionally, or alternatively, rigidizing can include curing (e.g., by heating), compression molding, bladder molding, or other suitable methods of hardening the CMC nozzle shell 70.

The term "partially rigidizing" (and grammatical equivalents thereof) includes rigidizing to a detectable point but not rigidizing to a fully rigidized point. The term "fully rigidized" includes rigidizing to a point for which an object is rigidized to a desired end point. The rigidizing terms form a hierarchy with some overlap between proximate terms. For example, the terms non-rigidized, partially rigidized, and fully rigidized express increasing amount of rigidizing (with some overlap).

The term "co-rigidizing" (and grammatical equivalents thereof) includes rigidizing at substantially the same time or, at a minimum, an overlapping period during which two objects are rigidized. Co-rigidizing can produce a substantially continuous matrix phase with additional strength believed (although not intended to be limited by theory) to be provided by increased bonding between the airfoil 74, the outer nozzle platform 72, and the inner nozzle platform 76.

In an exemplary embodiment, the preform including the airfoil body 74, the outer nozzle platform 72, and the inner nozzle platform 76 may be co-rigidized with an initial partial rigidizing followed by a subsequent rigidizing. In all embodiments, when rigidizing is substantially complete, a rigidized vane preform is formed.

After rigidizing, the components may be subjected to a burn-out, or off-gassing, step (not separately included in the flowchart). In this step, the organic components, such as plasticizers, are converted to carbon.

Next, the rigidized vane preform is densified (step 380) in one or more steps. For example, the vane preform can be partially densified by introducing a carbon-containing slurry (as is known in the art) into the porosity of the rigidized vane preform, and can be further densified with at least silicon, and alternatively boron doped silicon, through a melt infiltration process (as known in the art) to form the finished CMC nozzle shell 70.

Other techniques for forming components according to the present disclosure include polymer infiltration and pyrolysis ("PIP"). In this process, silicon carbide fiber preforms are infiltrated with a pre-ceramic polymer, such as polysilazane and then heat-treated to form a SiC matrix. Alternatively, the components may include an oxide/oxide process. In this type of processing, aluminum or aluminosilicate fibers may be prepregged and then laminated into a preselected geometry and subsequently heated to form the ceramic matrix. Components may also be fabricated from a carbon fiber reinforced silicon carbide matrix (C/SiC) CMC. The C/SiC processing includes laying up a carbon fibrous preform in the preselected geometry. As utilized in the slurry cast method for SiC/SiC, the tool may be made of a graphite material. The fibrous preform is supported by the tooling during a chemical vapor infiltration process at about 1200° C., whereby the C/SiC CMC component is formed.

Thereafter, the CMC nozzle shell 70 can be machined (step 390) to provide the desired final geometry. In this embodiment, the outer wall and inner nozzle platforms 72, 76 can include SiC-coated fibers and a polymer-based matrix. Materials such as a low melt alloy, machining wax, and/or polymeric materials can be used to encapsulate the platforms 72, 76, if desired. To avoid adsorption of contaminates that exist in some machining fluids, the CMC nozzle shell 70 may be cooled with water during machining. The cutting and/or grinding direction may be predetermined to avoid tearing out fibrous materials. Cutting and/or grinding speeds may also be predetermined to avoid damage to CMC nozzle shell 70 in the form of delamination or removal of fibers at the surface.

Exemplary embodiments of the present CMC nozzle shell and processes for manufacturing a CMC nozzle are described above in detail. The methods and components described herein are not limited to the specific embodiments described herein, but rather, aspects of the methods and components may be utilized independently and separately from other components described herein. For example, the methods and components described herein may have other applications not limited to practice with turbine nozzles for power-generating gas turbines, as described herein. Rather, the methods and components described herein can be implemented and utilized in various other industries.

While the technical advancements have been described in terms of various specific embodiments, those skilled in the art will recognize that the technical advancements can be practiced with modification within the spirit and scope of the claims.

What is claimed is:

1. A method of manufacturing a ceramic matrix composite (CMC) turbine nozzle shell, the method comprising:
    stacking and de-bulking a first plurality of platform plies to assemble a primary outer nozzle platform;
    stacking and de-bulking a second plurality of platform plies to assemble a primary inner nozzle platform;
    stacking a plurality of trailing edge plies in a V-shape;
    assembling a core and trailing edge preform by wrapping a plurality of core plies around a tool having a wider end and a narrower end to define a hollow airfoil shape and by arranging the stacked trailing edge plies adjacent the narrower end of the plurality of core plies;
    assembling an airfoil-shaped body by:
        circumferentially wrapping a set of composite wrap plies around the core and trailing edge preform, each composite wrap ply of the set of composite wrap plies having a first layer with first unidirectional fibers oriented in parallel to a longitudinal axis of the CMC turbine nozzle shell and a second layer having unidirectional fibers oriented in a transverse direction relative to the first unidirectional fibers, wherein each composite wrap ply has a first longitudinal edge and a second longitudinal edge;
        cutting the first longitudinal edge and the second longitudinal edge into fingers; and
        folding the fingers in a transverse direction away from the core plies and interleaving the fingers of each composite wrap ply between secondary platform plies to define a secondary inner nozzle platform and a secondary outer nozzle platform;
    joining the primary outer nozzle platform to the secondary outer nozzle platform; and
    joining the primary inner nozzle platform to the secondary inner nozzle platform,
    wherein:
        the primary outer nozzle platform includes a plurality of stacked primary platform plies at least three in number directly adjacent to one another which are disposed axially outward from the composite wrap plies defining the airfoil shape;
        the primary inner nozzle platform includes a plurality of stacked primary platform plies at least three in number directly adjacent to one another which are disposed axially inward from the composite wrap plies defining the airfoil shape; or
        the primary outer nozzle platform includes a plurality of stacked primary platform plies at least three in number directly adjacent to one another which are disposed axially outward from the composite wrap plies defining the airfoil shape and the primary inner nozzle platform includes a plurality of stacked primary platform plies at least three in number directly adjacent to one another which are disposed axially inward from the composite wrap plies defining the airfoil shape.

2. The method of claim 1, wherein the steps of forming the primary outer nozzle platform and forming the primary inner nozzle platform are performed simultaneously.

3. The method of claim 1, wherein the platform plies in the first plurality of platform plies comprise first platform plies with unidirectional fibers oriented in a first fiber direction and second platform plies with unidirectional fibers oriented in a second fiber direction transverse to the first fiber direction; and wherein the stacking and de-bulking of the first plurality of platform plies in the assembling of the primary outer nozzle platform comprises alternating the first platform plies with the second platform plies.

4. The method of claim 3, wherein the assembling of the primary outer nozzle platform further comprises green-machining of the stacked and de-bulked first plurality of platform plies.

5. The method of claim 1, wherein the platform plies in the second plurality of platform plies comprise third platform plies with unidirectional fibers oriented in a third fiber direction and fourth platform plies with unidirectional fibers oriented in a fourth fiber direction transverse to the third fiber direction; and wherein the stacking and de-bulking of the second plurality of platform plies in the assembling of the primary inner nozzle platform comprises alternating the third platform plies with the fourth platform plies.

6. The method of claim 5, wherein the assembling of the primary inner nozzle platform further comprises green-machining of the stacked and de-bulked second plurality of platform plies.

7. The method of claim 1, wherein the step of assembling the airfoil-shaped body further comprises circumferentially wrapping each composite wrap ply of the set of composite wrap plies around the core and trailing edge preform, such that each first layer and each second layer are wrapped in alternating arrangement around the core plies.

8. The method of claim 1, wherein the assembling of the airfoil-shaped body further comprises disposing a plurality of filler panels radially outward of the folded fingers of each composite wrap ply, such that a substantially uniform ply layer is interleaved between the secondary platform plies.

9. The method of claim 1, further comprising rolling up one or more plies to produce a first concave fillet and circumscribing the airfoil-shaped body at a joint between the airfoil-shaped body and the secondary outer nozzle platform with the first concave fillet.

10. The method of claim 1, further comprising rolling up one or more plies to produce a second concave fillet and circumscribing the airfoil-shaped body at a joint between the airfoil-shaped body and the secondary inner nozzle platform with the second concave fillet.

11. The method of claim 1, further comprising the step of rigidizing the airfoil-shaped body, the outer nozzle platform, and the inner nozzle platform, after the steps of joining the primary outer nozzle platform to the secondary outer nozzle platform of the airfoil-shaped body and joining the primary inner nozzle platform to the secondary inner nozzle platform of the airfoil-shaped body; and wherein the step of rigidizing produces a rigidized CMC turbine nozzle.

12. The method of claim 11, further comprising densifying the rigidized CMC turbine nozzle using a melt-infiltration process.

13. The method of claim 1, wherein the primary outer nozzle platform includes the plurality of stacked primary platform plies at least three in number directly adjacent to one another which are disposed axially outward from the composite wrap plies defining the airfoil shape.

14. The method of claim 1, wherein the primary inner nozzle platform includes the plurality of stacked primary platform plies at least three in number directly adjacent to one another which are disposed axially inward from the composite wrap plies defining the airfoil shape.

15. The method of claim 1, wherein the primary outer nozzle platform and the primary inner nozzle platform each extends radially outward from the core plies in the transverse direction away from the longitudinal axis.

16. The method of claim 1, wherein the primary outer nozzle platform includes the plurality of stacked primary platform plies at least three in number directly adjacent to one another which are disposed axially outward from the composite wrap plies defining the airfoil shape and the primary inner nozzle platform includes the plurality of stacked primary platform plies at least three in number directly adjacent to one another which are disposed axially inward from the composite wrap plies defining the airfoil shape.

* * * * *